US007894565B2

(12) United States Patent
Heibel et al.

(10) Patent No.: US 7,894,565 B2
(45) Date of Patent: Feb. 22, 2011

(54) SUBCRITICAL REACTIVITY MEASUREMENT METHOD

(75) Inventors: Michael D. Heibel, Harrison City, PA (US); Patrick J. Sebastiani, Jeannette, PA (US); Stanwood L. Anderson, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 166 days.

(21) Appl. No.: 12/332,577

(22) Filed: Dec. 11, 2008

(65) Prior Publication Data

US 2010/0150295 A1 Jun. 17, 2010

(51) Int. Cl.
*G21C 17/00* (2006.01)

(52) U.S. Cl. ........................ 376/254; 376/245; 376/255

(58) Field of Classification Search ................. 376/254, 376/245, 255

See application file for complete search history.

(56) References Cited

U.S. PATENT DOCUMENTS 4,580,056 A 4/1986 Kaiser et al.
4,920,548 A 4/1990 Gaussa, Jr. et al.
6,181,759 B1 1/2001 Heibel
6,801,593 B2 10/2004 Chao et al.
2004/0101082 A1 5/2004 Chao et al.

FOREIGN PATENT DOCUMENTS

EP 0462768 A1 4/1990
GB 1365775 9/1974
JP 63 172984 A 7/1988
JP 2001 083280 3/2001

OTHER PUBLICATIONS

Database WPI Week 200866, Thomson Scientific, London, GB; AN 2008-L20080, Aug. 27, 2008 (Abstract).

*Primary Examiner*—Rick Palabrica

(57) ABSTRACT

A method of determining the spatially corrected inverse count ratio (SCICR) used to determine reactor criticality, which subtracts a background noise signal from the source range detector output. The method monitors the source range detector signal at two different core temperature levels during a transient portion of the detector output as the power output of the reactor is increased in the source range. This information is employed to analytically determine the background noise signal, which is then subtracted from the detector outputs to obtain the SCICR reactivity measurement.

7 Claims, 2 Drawing Sheets

12
22
26
24
26
20
28
14
18
10
16
20
26
22
24

SUBCRITICAL REACTIVITY MEASUREMENT METHOD

BACKGROUND OF THE INVENTION

1. Field of the Invention

This invention relates to a method for measuring the subcritical neutron multiplication factor, $K_{eff}$ of a nuclear reactor, and more particularly, to a method for determining all reactivity changes that occur while a core of a nuclear reactor is subcritical.

2. Related Art

In a pressurized water reactor power generating system, heat is generated within the core of a pressure vessel by a fission chain reaction occurring in a plurality of fuel rods supported within the core. The fuel rods are maintained in space relationship within fuel assemblies with the space between fuel rods forming coolant channels through which borated water flows. Hydrogen within the coolant water moderates the neutrons emitted from enriched uranium within the fuel to increase the number of nuclear reactions and thus increase the efficiency of the process. Control rod guide thimbles are interspersed within the fuel assemblies in place of fuel rod locations and serve to guide control rods which are operable to be inserted or withdrawn from the core. When inserted, the control rods absorb neutrons and thus reduce the number of nuclear reactions and the amount of heat generated within the core. Coolant flows through the assemblies out of the reactor to the tube side of steam generators where heat is transferred to water in the shell side of the steam generators at a lower pressure, which results in the generation of steam used to drive a turbine. The coolant exiting the tube side of the steam generator is driven by a main coolant pump back to the reactor in a closed loop cycle to renew the process.

The power level of a nuclear reactor is generally divided into three ranges: the source or startup range, the intermediate range, and the power range. The power level of the reactor is continuously monitored to assure safe operation. Such monitoring is typically conducted by means of neutron detectors placed outside and inside the reactor core for measuring the neutron flux of the reactor. Since the neutron flux in the reactor at any point is proportional to the fission rate, the neutron flux is also proportional to the power level.

Fission and ionization chambers have been used to measure flux in the source, intermediate and power range of a reactor. Typical fission and ionization chambers are capable of operating at all normal power levels, however, they are generally not sensitive enough to accurately detect low level neutron flux emitted in the source range. Thus, separate low level source range detectors are typically used to monitor neutron flux when the power level of the reactor is in the source range.

The fission reactions within the core occur when free neutrons at the proper energy level strike the atoms of the fissionable material contained within the fuel rods. The reactions result in the release of a large amount of heat energy which is extracted from the core in the reactor coolant and in the release of additional free neutrons which are available to produce more fission reactions. Some of these released neutrons escape the core or are absorbed by neutron absorbers, e.g., control rods, and therefore do not cause traditional fission reactions. By controlling the amount of neutron absorbent material present in the core, the rate of fission can be controlled. There are always random fission reactions occurring in the fissionable material, but when the core is shut down, the released neutrons are absorbed at such a high rate that a sustained series of reactions do not occur. By reducing the neutron absorbent material until the number of neutrons in a given generation equals the number neutrons in the previous generation, the process becomes a self sustaining chain reaction and the reactor is said to be in "critical". When the reactor is critical, the neutron flux is six or so orders of magnitude higher than when the reactor is shut down. In some reactors, in order to accelerate the increase in neutron flux in the shut down core to achieve practical transition intervals, an artificial neutron source is implanted in the reactor core among the fuel rods containing the fissionable material. This artificial neutron source creates a localized increase in the neutron flux to aid in bringing the reactor up to power.

In the absence of a neutron source, the ratio of the number of free neutrons in one generation to those in the previous generation is referred to as the "neutron multiplication factor" ($K_{eff}$) and is used as a measure of the reactivity of the reactor. In other words, the measure of criticality for a nuclear core is $K_{eff}$, that is, the ratio of neutron production to total neutron loss contributable to both destruction and loss. When $K_{eff}$ is greater than 1, more neutrons are being produced than are being destroyed. Similarly, when $K_{eff}$ is less than one, more neutrons are being destroyed than are being produced. When $K_{eff}$ is less than one, the reactor is referred to as being "subcritical". Until relatively recently, there has been no direct method for measuring when criticality will occur from the source range excore detectors. Plant operators typically estimated when criticality will occur through a number of methods. One method for estimating when criticality will occur is made by plotting the inverse ratio of the count rate obtained from the source range detector as a function of the change in conditions being used to bring the plant critical, e.g., withdrawal of the control rods. When the plant goes critical, the source range count rate approaches infinity and hence, the Inverse Count Rate Ratio (ICRR) goes to zero. Due to the physics of the reaction occurring within the core of the reactor, the ICRR curve is almost always convex, and sometimes concave. Therefore, estimating the conditions under which the plant will go critical from the ICRR curve is subject to much uncertainty, but also subject to considerable scrutiny by the Nuclear Regulatory Commission and Institute of Nuclear Power Operations.

More recently, a method has been devised for directly predicting when the reactor will go critical. The method is described in U.S. Pat. No. 6,801,593. In accordance with the method, the reactivity of the reactive core is increased while monitoring an output of a source range detector. The inverse count rate ratio from the output of the detector is determined periodically during a transient portion of the output. A correction factor is applied to the inverse count rate ratio data and the data is plotted as function of time. The correction factor linearizes the inverse count rate ratio so that the curve can be predictably extrapolated. The method thus describes a spatially corrected inverse count rate core reactivity measurement process. However, this method does not address the accuracy of the core reactivity measurement, which is dependent on the accuracy of the measured neutron radiation levels. In particular, it is very important that fractional changes in the measured neutron levels are determined accurately. The largest neutron measurement error component in a properly operating neutron radiation detector is typically caused by what is commonly called a "background signal". The background signal induces a response in the detector measurement that is not caused by source neutrons. This results in errors in the measured core reactivity changes. In order to improve the accuracy of the neutron population measurement, and obtain a corresponding improvement in accuracy in the inverse count rate ratio reactivity measurement process, it is necessary to remove the background signal component from the measurement before the measurement is used to calculate the reactivity change. To this point in time, there has been no direct method of determining the background signal content in a neutron signal measurement from the typical neutron detectors used in commercial nuclear power facilities.

Accordingly, a method is desired that can be demonstrated to produce an accurate determination of the background content of neutron signals measured at commercial nuclear power facilities. Furthermore, such a method is desired that will not require any changes to existing commercial nuclear power plant equipment or operating practices.

SUMMARY OF THE INVENTION

This invention satisfies the foregoing objectives by providing a method for determining the nearness to criticality of a nuclear reactor having a control rod configuration in a core region of the reactor vessel and a coolant moderator circulating through the core. The steps of the method first monitors a source range detector signal during a transient portion of the detector output to obtain a neutron radiation level of the core when the coolant moderator is at a density corresponding to a first temperature in the source power range. The temperature of the core is then raised to a second temperature and a second source range detector signal is monitored to obtain a neutron radiation level of the core when the coolant moderator is at a density corresponding to the second temperature. The method then determines the background non-neutron signal component based upon the monitored first and second source range detector signals in accordance with the relationship $$N = \frac{\left\{\frac{K_{eff}^{H} - K_{eff}^{C}}{1 - K_{eff}^{H}} + \frac{R(T_H)}{R(T_C)} + \frac{F_H}{F_C} - 1\right\} C_{MC} - C_{MH}}{\left\{\frac{K_{eff}^{H} - K_{eff}^{C}}{1 - K_{eff}^{H}} + \frac{R(T_H)}{R(T_C)} + \frac{F_H}{F_C} - 1\right\} - 1}$$

The background non-neutron signal component is then removed from the monitored neutron radiation level obtained at the second temperature to obtain a background adjusted neutron radiation level which is then used in the inverse count rate ratio to determine the nearness to criticality.

Desirably, the control rod configuration and the concentration of the moderator remain unchanged between the monitoring of the first source range detector signal and the monitoring of the second source range detector signal. In one preferred embodiment, in determining the background non-neutron signal component, the term $1/ICRR_{EH}$ is closely approximated from a ratio of the monitored values of the first and second source range detector signals to arrive at an initial value of the background non-neutron signal component (N). The initial value of N is then preferably subtracted from the values of the first and second source range detector signals and a residual of N is calculated. The process is then repeated by raising the temperature of the core to a third temperature and monitoring a third source range detector signal during a transient portion of the detector output when the coolant moderator is at a density corresponding to the third temperature. The second source range detector signal and the third source range detector signal are then processed as above to calculate a new residual value of N. The process is repeated until a final residual value of N is determined which is less than the resolution limit of the source range signal measurement. Then a final value of N is obtained from the sum of all the values of N used to produce the final residual value of N.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
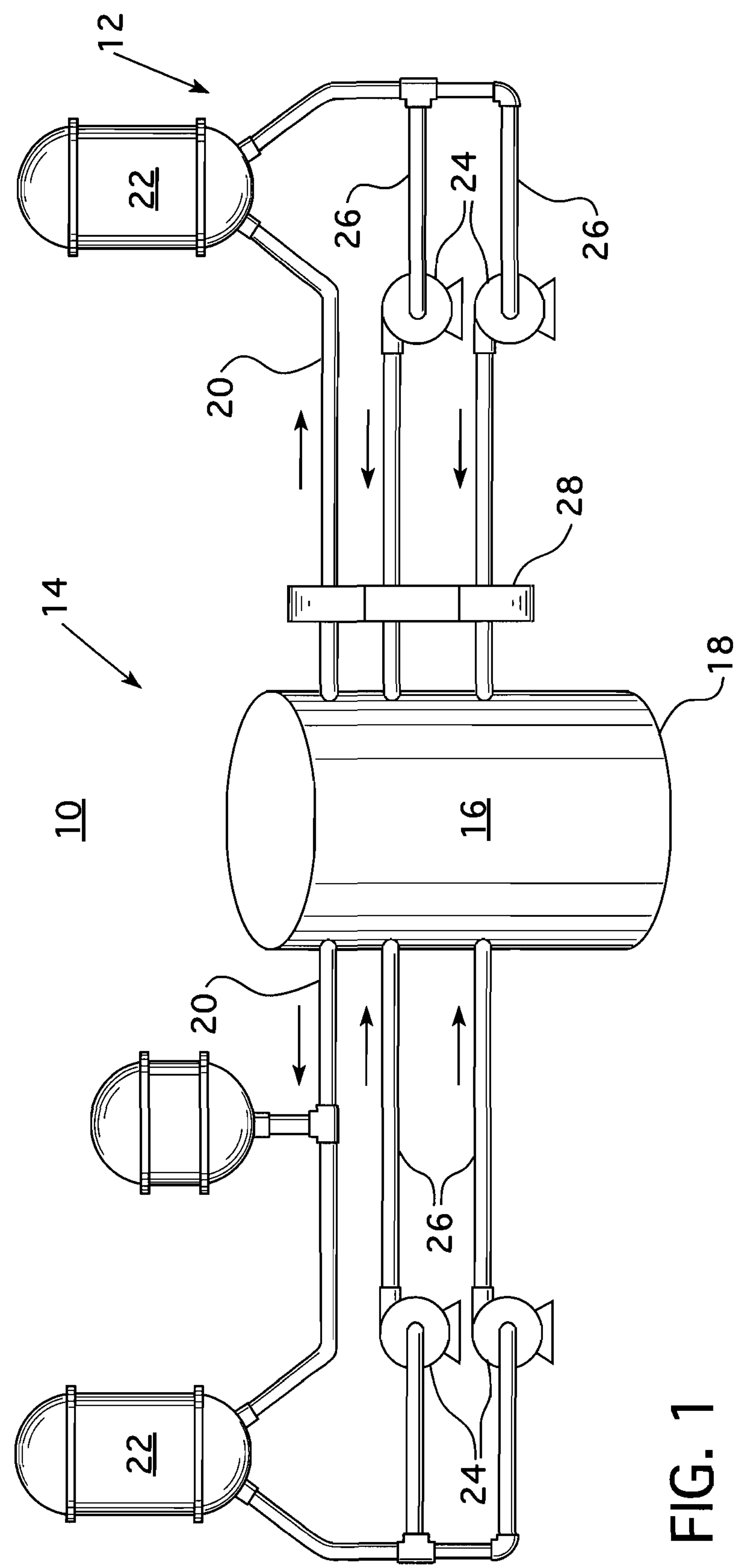
FIG. 1 is a schematic representation of the primary side of a nuclear power generating system.
Figure 2:
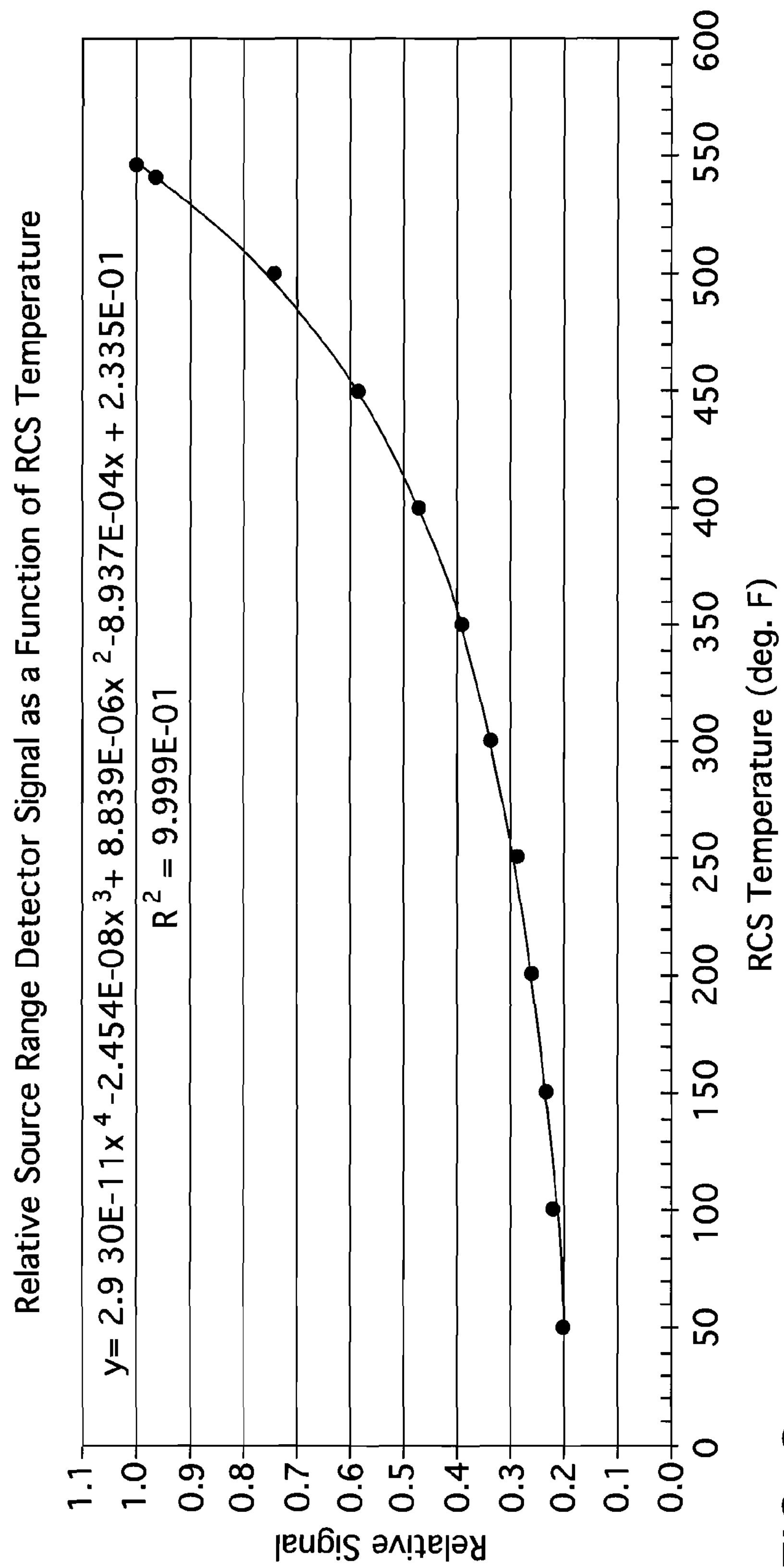
FIG. 2 is a plot of the relative source range detector signal as a function of the reactor coolant system temperature.

FIG. 1 illustrates the primary side of a nuclear electric power generating plant 10 in which a nuclear steam supply system 12 supplies steam for driving a turbine generator (not shown) to produce electric power. The nuclear steam supply system 12 has a pressurized water reactor 14 which includes a reactor core 16 housed within a pressure vessel 18. Fission reactions within the reactor core 16 generate heat, which is absorbed by a reactor coolant, like water, which is passed through the core. The heated coolant is circulated through hot leg piping 20 to a steam generator 22. Reactor coolant is returned to the reactor 14 from the steam generator 22 by a reactor coolant pump 24 from the cold leg piping 26. Typically, a pressurized water reactor has at least two and often three or four steam generators 22 each supplied with heated coolant through a hot leg 20, forming with the cold leg 26 and the reactor coolant pump 24, a primary loop. Each primary loop supplies steam to the turbine generator. Two such loops are shown in FIG. 1.

Coolant returned to the reactor 14 flows downward through an annular downcomer and then upward through the core 16. The reactivity of the core, and therefore the power output of the reactor 14 is controlled on a short term basis by control rods, which may be selectively inserted into the core. Long term reactivity is regulated through control of the concentration of a neutron moderator such as boron dissolved in the coolant. Regulation of the boron concentration affects reactivity uniformly throughout the core as the coolant circulates through the entire core. On the other hand, the control rods affect local reactivity and therefore, result in an asymmetry of the axial and radial power distribution within the core 16.

Conditions within the core 16 are monitored by several different sensor systems. These include an excore detector system 28, which measures neutron flux escaping from the reactor vessel 14. The excore detector 28 includes source range detectors used when the reactor is shut down, intermediate range detectors used during startup and shut down, and power range detectors used when the reactor is above approximately five percent power. In core detectors are also typically employed during power operation.

As previously stated, nuclear power plants and other nuclear facilities such as spent nuclear fuel pits have no accurate direct measure of reactivity or $K_{eff}$ when the plant or facility is subcritical. As previously mentioned, the estimate of when criticality will occur is made by plotting the inverse ratio of the count rate obtained from the source range detectors as a function of the change in the condition being used to bring the plant to criticality, e.g., withdrawal of the fuel rods. When the plant goes critical, the source range count rate approaches infinity and the inverse count ratio goes to zero. As described in U.S. Pat. No. 6,801,593, it can be shown that the response of the excore detector to the change used to make the reactor critical is linear if the nuclear core is only a point. It is the dimensional nature of the nuclear core that makes the ICRR curve non-linear. In accordance with the method noted in the foregoing patent, a correction factor can be analytically determined and applied to the measured excore detector response to establish a function that is linear in $K_{eff}$. Thus, changes in $K_{eff}$, known as reactivity, resulting from the change being made to the reactor, can be determined along with the absolute value of $K_{eff}$. The linearized inverse count rate is referred to as the Spatially Corrected Inverse Count Rate (SCICR). This has enormous value to the utility because, with this information, the utility will know by how much reactivity the reactor is shut down or subcritical. Thus, the utility will know how safe the core is, when the core is going critical ($K_{eff}$=1.0), what changes will have to be made to make the core critical and whether all the appropriate technical specification requirements are met. In addition, this method enables the utilities to measure reactivity changes while the core is subcritical. Thus, it is possible to perform control and shut down bank measurements typically performed during the low power physics testing, while the plant is subcritical. This will reduce the amount of time the plant is shut down for refueling, because performing the low power physics testing is the last event that occurs before taking the plant up to power and generating electricity. The low power physics testing measures critical core parameters such as boron concentration, worth of individual control banks and moderator temperature coefficients to demonstrate that the design margin is adequate, a necessary step before the reactor is permitted to return to power. This invention takes the method described in U.S. Pat. No. 6,801,593 one step further by determining the constant "noise" or "background" component of a measured source range detector signal to provide a more exact measurement to reduce the margins that are built into the criticality determinations because of the uncertainty associated with the determination.

Accordingly, in accordance with this method one can characterize the Source Range (SR) count rate measured at some time following the completion of a core reload during a refueling outage with the reactor coolant system (RCS) temperature at approximately 90° F. (i.e., cold conditions) as follows:

$$C_{MC}=\text{measured } SR \text{ count rate with reactor at cold conditions}=\Phi+N \quad (1)$$

The symbol Φ represents the thermal neutron flux in the core near the SR detector at completion of core loading and the completion of the SR detector operating voltage and discriminator setting adjustments. The variable N represents the non-neutron induced portion of the measured SR count rate signal. The N component is composed of SR pulses caused by high energy gamma interactions in the active volume of the SR detector, and pulses caused by electrical "noise" contained in the measured SR signal. The value of SR count rate that should exist following a reactor temperature increase ($C_{EH}$), assuming there is no non-neutron induced signal component in the measured SR signal, ($C_{MC}$), is given by the expression:

$$C_{EH}=MC_{MC}=M(\Phi+N) \quad (2)$$

The value of the factor M includes the effects that changes in reactor water density, changes in core reactivity, and changes in core power distribution have on the expected change in the measured SR count rate as the reactor coolant temperature increases assuming there is no non-neutron induced SR signal component.

If a non-neutron SR signal component is present, it is likely that the background signal is composed of a combination of high energy gamma radiation and electrical noise-induced pulses. Most of the high energy gamma radiation is from the reactor vessel. The potential sources of electrical noise are legion, and reside outside of the reactor vessel. Consequently, neither of these non-neutron signal components is likely to be significantly influenced by changes in reactor coolant temperature. Therefore, the actual SR count rate measured following a temperature increase ($C_{MH}$) can be better expressed:

$$C_{MH}=M\Phi+N \quad (3)$$

The difference between the value of the expected count rate after a temperature increase, assuming a "pure" neutron signal, and the measured count rate after the temperature increase ($C_{EH}$ and $C_{MH}$, respectively) can be used to determine the value of the non-neutron signal component N. The algebra for this calculation is as follows:

$$C_{EH}-C_{MH}=M(\Phi+N)-(M\Phi+N)$$

or $$C_{EH}-C_{MH}=MN-N$$

or $$C_{EH}-C_{MH}=N(M-1) \quad (4a, b, c)$$

Solving for N:

$$N=\frac{C_{EH}-C_{MH}}{M-1} \quad (5)$$

Per Equation 2, the value of $C_{EH}$ can be expressed in terms of $MC_{MC}$, allowing N to be expressed as:

$$N=\frac{MC_{MC}-C_{MH}}{M-1} \quad (6)$$

The value of M must be calculated prior to determining the background value N. The value of M is a function of the change in the density of the reactor coolant that occurs between the initial and final temperatures during the heatup. The value of M is also a function of the reactivity changes that may occur during the heatup and the changes in SR count rate due to the spatial re-distribution effects of RCS temperature and boron concentration changes during the heatup. A convenient way to determine the value of M is to establish an analytical model of the SR count rate that is expected to exist following the temperature increase previously defined in Equation 2. The value of $C_{EH}$ can be modeled using a differential change approach as follows:

$$C_{EH}=C_{MC}+\frac{\partial C}{\partial T}\Delta T+\frac{\partial C}{\partial K_{eff}}\Delta K_{eff}+\frac{\partial C}{\partial F}\Delta F \quad (7)$$

The $K_{eff}$ differential term is expressed in terms of changes in the count rates and $K_{eff}$ at the hot and cold temperatures as:

$$\frac{\partial C}{\partial K_{eff}}=\frac{C_{EH}-C_{MC}}{K_{eff}^{H}-K_{eff}^{C}} \quad (8)$$

The expression for spatially-corrected ICRR can be used to express the differential in terms of count rate. Assuming that the reference condition count rate is $C_{MC}$, the expected ICRR at the hot condition ($ICRR_{EH}$) is:

$$ICRR_{EH} = \frac{C_{MC}}{C_{EH}} = \frac{1 - K_{eff}^{H}}{1 - K_{eff}^{C}} \tag{9}$$

This expression can be rearranged to express $C_{EH}$ in terms of $C_{MC}$. This expression is:

$$C_{EH} = \frac{1 - K_{eff}^{C}}{1 - K_{eff}^{H}} C_{MC} \tag{10}$$

The expression in Equation 10 may be substituted back into Equation 8 to produce the expression:

$$\frac{\partial C}{\partial K_{eff}} = \frac{\left[\frac{1 - K_{eff}^{C}}{1 - K_{eff}^{H}} - 1\right] C_{MC}}{K_{eff}^{H} - K_{eff}^{C}} \tag{11}$$

Multiplying Equation 11 by the expected change in $K_{eff}$ produces the term representing the expected total change in count rate due to the expected change in reactivity when the reactor temperature increases. This expression is:

$$\frac{\partial C}{\partial K_{eff}} \Delta K_{eff} = \left[\frac{1 - K_{eff}^{C}}{1 - K_{eff}^{H}} - 1\right] C_{MC} \tag{12}$$

Equation 12 may also be expressed:

$$\frac{\partial C}{\partial K_{eff}} \Delta K_{eff} = \left[\frac{K_{eff}^{H} - K_{eff}^{C}}{1 - K_{eff}^{H}}\right] C_{MC} \tag{13}$$

The temperature differential term is the change in count rate due only to changes in the reactor water density. The impact that changes in water density have on the measured count rate during Subcritical Rod Worth Measurement (SRWM) can be derived using the method used to determine the Downcomer Temperature Attenuation Factor (DTAF). FIG. 1 presents the relationship between relative count rate as a function of RCS temperature increase (R(T)) determined from the DTAF model used for the Westinghouse 4-loop reactors at Site A.

The polynomial fit derived from the data shown is also shown on FIG. 1. The polynomial expression for R can be used to derive the needed expression for the relationship between changes in the count rate as a function of changes in RCS temperature. The temperature differential term shown in Equation 7 may be represented by the expression:

$$\frac{\partial C}{\partial T} = \frac{C_{MC}}{R(T_C)} \frac{dR}{dT} \tag{14}$$

The total change in value of $C_{EH}$ driven by the temperature increase may now be expressed:

$$\frac{\partial C}{\partial T} \Delta T = \frac{C_{MC}}{R(T_C)} \frac{dR}{dT} (T_H - T_C) \tag{15}$$

$$= \frac{C_{MC}}{R(T_C)} \left\{\frac{R(T_H) - R(T_C)}{T_H - T_C}\right\} (T_H - T_C)$$

Equation 15 reduces to:

$$\frac{\partial C}{\partial T} \Delta T \cong C_{MC} \left\{\frac{R(T_H)}{R(T_C)} - 1\right\} \tag{16}$$

The expression for the expected change in the cold count rate due to change in the spatial correction factor (F) is developed in a similar fashion used for the temperature change term. The differential term in F can be approximated:

$$\frac{\partial C}{\partial F} \cong \frac{C_{EH} - C_{MC}}{F_H - F_C} \tag{17}$$

The value of $C_{EH}$ expected due to the change in temperature may be expressed in terms of $C_{MC}$ using the expression:

$$C_{EH} = \frac{F_H}{F_C} C_{MC} \tag{18}$$

$F_H$ and $F_C$ are the spatial correction factors at the hot and cold temperature conditions, respectively. Substituting Equation 18 into Equation 17 and rearranging produces the expression:

$$\frac{\partial C}{\partial F} \Delta F \cong C_{MC} \left\{\frac{F_H}{F_C} - 1\right\} \tag{19}$$

Substituting the product expressions from Equations 13, 16 and 19 into the appropriate locations in Equation 7 yields the following expression for $C_{EH}$:

$$C_{EH} = \left\{\frac{K_{eff}^{H} - K_{eff}^{C}}{1 - K_{eff}^{H}} + \frac{R(T_H)}{R(T_C)} + \frac{F_H}{F_C} - 1\right\} C_{MC} \tag{20}$$

Equation 3 provides the definition of $C_{EH}$ as the product of M and $C_{MC}$. An examination of Equation 20 shows that the value of M must be equal to:

$$M = \left\{\frac{K_{eff}^{H} - K_{eff}^{C}}{1 - K_{eff}^{H}} + \frac{R(T_H)}{R(T_C)} + \frac{F_H}{F_C} - 1\right\} \tag{21}$$

Equation 21 can be substituted into Equation 6 to develop a new expression for N. Equation 6 becomes:

$$N = \frac{\left\{\frac{K_{eff}^H - K_{eff}^C}{1 - K_{eff}^H} + \frac{R(T_H)}{R(T_C)} + \frac{F_H}{F_C} - 1\right\} C_{MC} - C_{MH}}{\left\{\frac{K_{eff}^H - K_{eff}^C}{1 - K_{eff}^H} + \frac{R(T_H)}{R(T_C)} + \frac{F_H}{F_C} - 1\right\} - 1} \tag{22}$$

In order for N to be accurately determined, it is important that each of the parameters listed in Equation 22 are either known or the changes in the parameters are kept small, allowing their effects to be neglected without affecting the value of N. The parameters associated with changes in $K_{eff}$ and F are based on nuclear design model calculations. The validity of the nuclear design model cannot be established until after SRWM is completed. Consequently, the validity of the $K_{eff}$ and F parameters is not known until after the need to use these parameters for the calculation of N has passed, suggesting that changes in these parameters should be kept small so that the value of N is not significantly influenced.

This methodology was applied to RCS heatup data obtained from Unit 1 of Site A during operating cycle 21 and Unit 2 during operating cycle 16. The background values for both units were derived using temperature increase data from approximately 90° F. to approximately 180° F. at a constant boron concentration and rod position. Table 1 presents the impact that the background count rate adjustments determined have on the critical boron results. The results shown in Table 1 demonstrate that application of the background correction calculated using the method of this invention causes a dramatic improvement in the accuracy of the calculated All-Rods-Out (ARO) critical boron relative to the actual ARO critical boron concentration. This accuracy improvement is seen at both Site A units.

TABLE 1

| Unit/Cycle | N31 Background Correction (cps) | N32 Background Correction (cps) | Original Calculated Critical ARO Boron (ppm) | Background Corrected Calculated Critical ARO Boron Concentration (ppm) | Measured Critical ARO Boron Concentration (ppm) |
|---|---|---|---|---|---|
| Unit 2 Cycle 16 | 5 | 5 | 1412 | 1376 | 1367 |
| Unit 1 Cycle 21 | 9 | 6 | 1813 | 1758 | 1758 |

While specific embodiments of the invention have been described in detail, it will appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A method of determining the nearness to criticality of a nuclear reactor having a control rod configuration in a core region of a nuclear reactor vessel and a coolant moderator circulating therethrough, comprising the steps of:

Monitoring a first source range detector signal (CMC) during a transient portion of the detector signal to obtain a neutron radiation level of the core when the coolant moderator is at a density corresponding to a first temperature;

Raising the temperature of the core to a second temperature;

Monitoring a second source range detector signal (CMH) during a transient portion of the detector signal to obtain a neutron radiation level of the core when the coolant moderator is at a density corresponding to the second temperature, the monitored first source range detector signal and the monitored second source range detector signal each having a background non-neutron signal component (N);

Determining the background non-neutron signal component based upon the monitored first and second source range detector signals in accordance with the relationship $$N = \frac{\left\{\frac{K_{eff}^H - K_{eff}^C}{1 - K_{eff}^H} + \frac{R(T_H)}{R(T_C)} + \frac{F_H}{F_C} - 1\right\} C_{MC} - C_{MH}}{\left\{\frac{K_{eff}^H - K_{eff}^C}{1 - K_{eff}^H} + \frac{R(T_H)}{R(T_C)} + \frac{F_H}{F_C} - 1\right\} - 1}$$

Removing the background non-neutron signal component from the monitored neutron radiation level obtained at the second temperature to obtain background adjusted neutron radiation level; and Determining the nearness to criticality based upon the background adjusted neutron radiation level.

2. The method of claim 1 wherein the nuclear reactor is a pressurized light water reactor.

3. The method of claim 2 wherein the moderator is borated water.

4. The method of claim 1 wherein the control rod configuration and a concentration of the moderator remain unchanged between the monitoring of the first source range detector signal and the monitoring of the second source range detector signal.

5. The method of claim 4 wherein in the step of determining the background non-neutron signal component a term $1/ICRR_{EH}$ is approximated from a ratio of the monitored values of CMH and CMC to arrive at an initial value of N.

6. The method of claim 5 including the step of subtracting the initial value of N from the values of $C_{MH}$ and $C_{MC}$ and calculating the residual value of N.

7. The method of claim 6 including the steps of:

Raising the temperature of the core to a third temperature;

Monitoring a third source range detector signal during a transient portion of the detector signal to obtain a neutron radiation level of the core when the coolant moderator is at a density corresponding to the third temperature;

Determining N from the second source range detector signal and the third source range detector signal using an approximation for $1/ICRR_{EH}$;

Calculating a new residual value of N;

Iterating the foregoing process until a final residual value of N is determined which is less than the resolution limit of a measurement of the source range signal; and Determining a final value of N from the sum of all the values of N used to produce the final residual value of N.

* * * * *